Dec. 23, 1947.　　　　H. K. WEISS　　　　2,433,006
APPARATUS FOR REGENERATING AND SMOOTHING DATA
Filed June 18, 1942　　　4 Sheets-Sheet 1
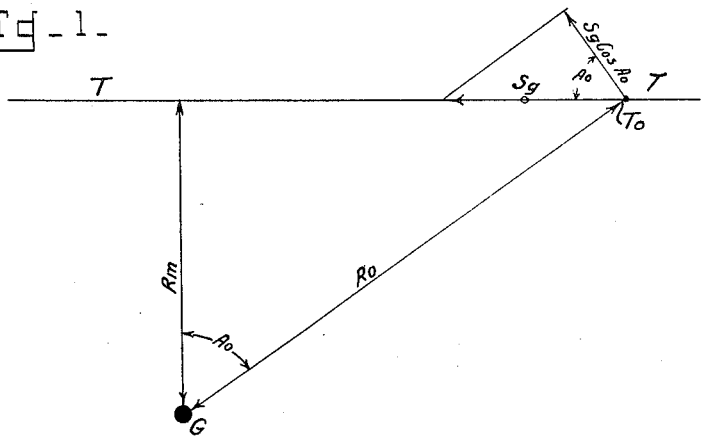
Inventor
Herbert K. Weiss Dec. 23, 1947.    H. K. WEISS    2,433,006
APPARATUS FOR REGENERATING AND SMOOTHING DATA
Filed June 18, 1942    4 Sheets-Sheet 2
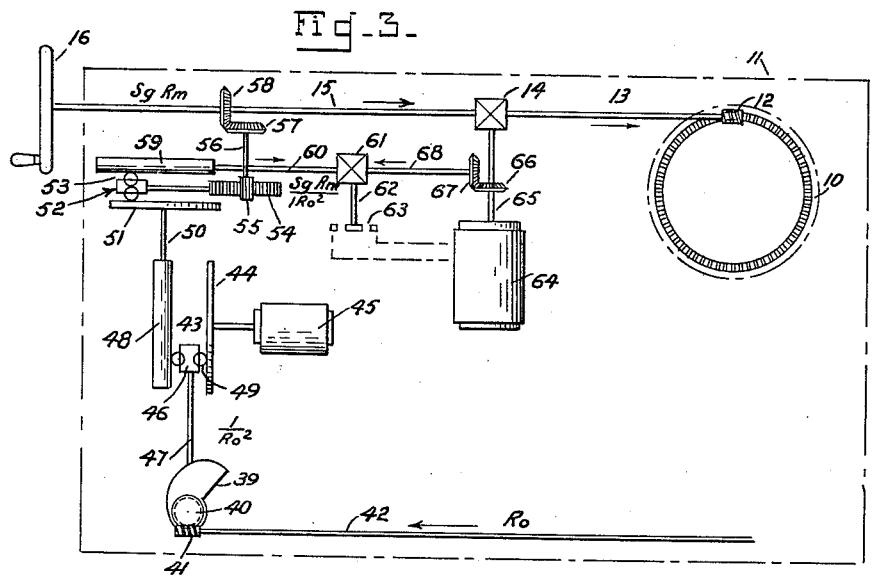
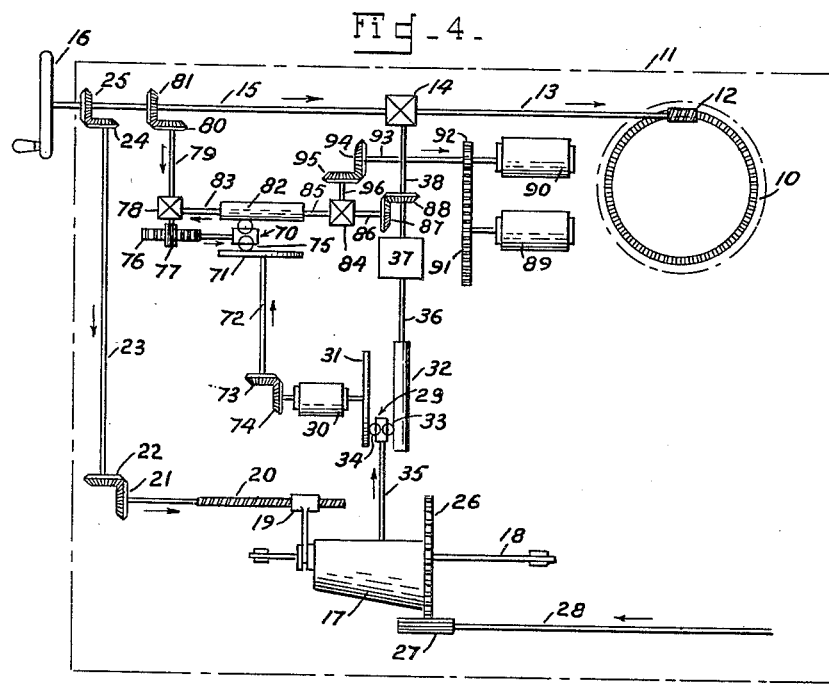
Inventor
Herbert K. Weiss

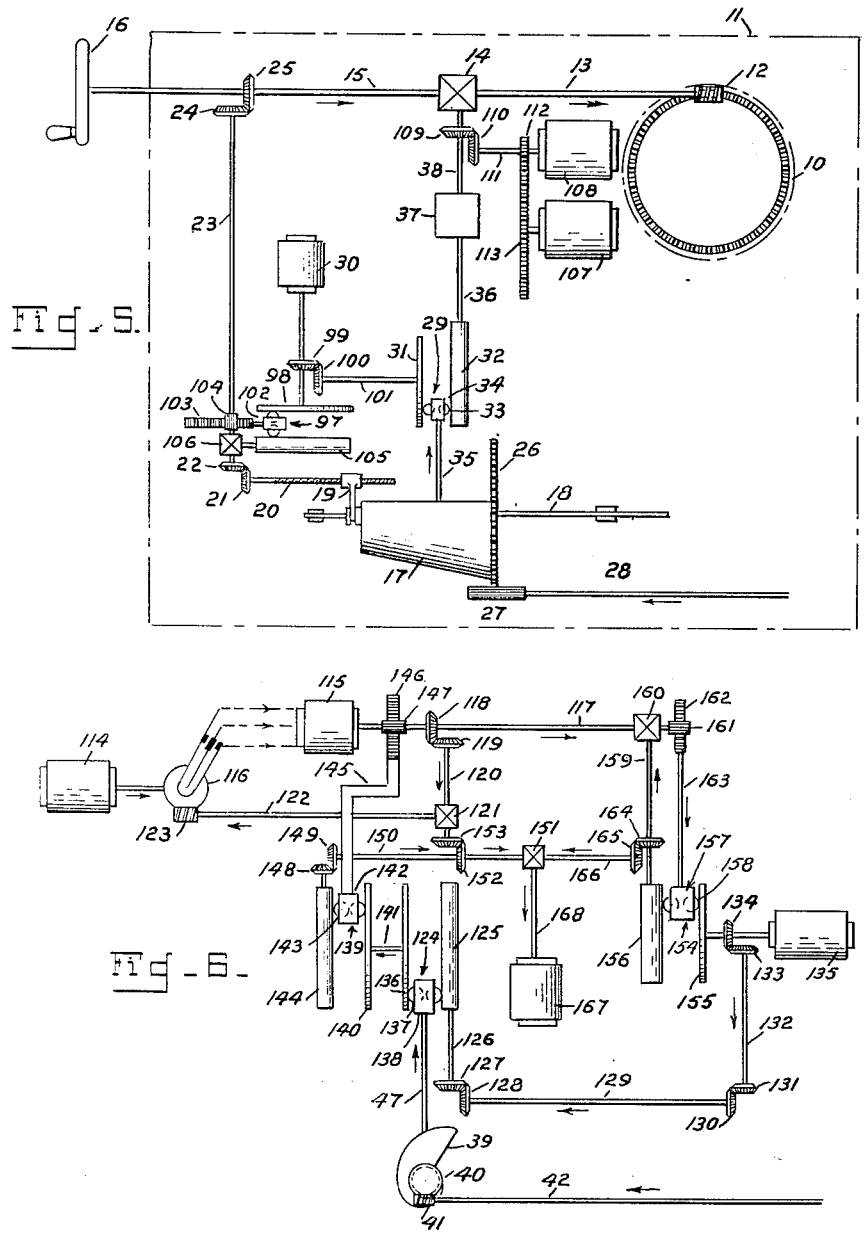

Dec. 23, 1947. H. K. WEISS 2,433,006
APPARATUS FOR REGENERATING AND SMOOTHING DATA
Filed June 18, 1942  4 Sheets-Sheet 4
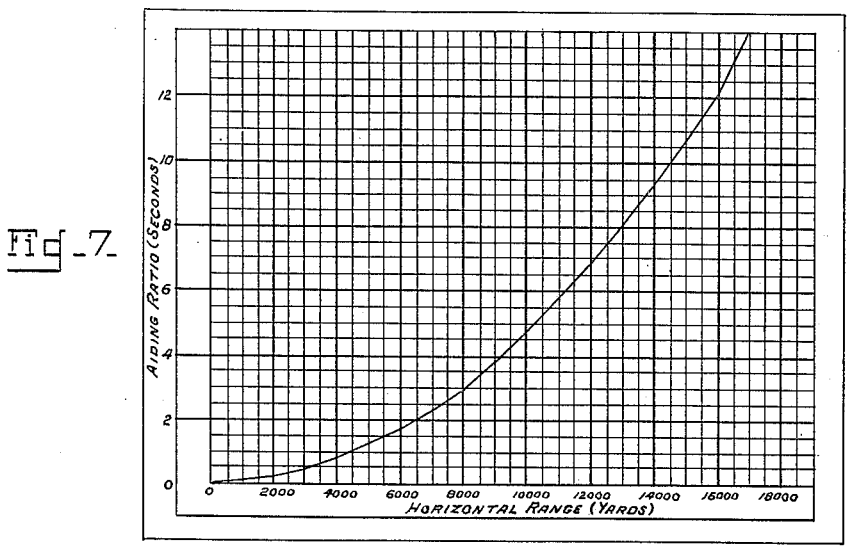
Fig_7.
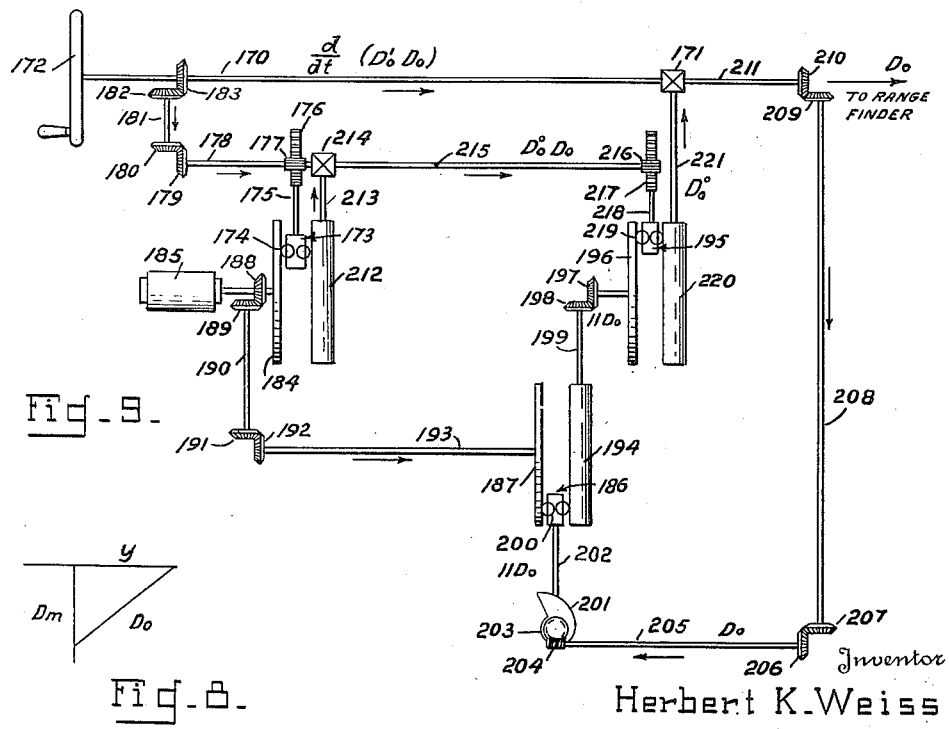
Fig_9.
Fig_8.
Inventor
Herbert K. Weiss
By G. J. Kessenich + J. H. Church
Attorneys Patented Dec. 23, 1947

2,433,006

UNITED STATES PATENT OFFICE 2,433,006

APPARATUS FOR REGENERATING AND SMOOTHING DATA

Herbert K. Weiss, Camp Davis, N. C.

Application June 18, 1942, Serial No. 447,556

10 Claims. (Cl. 235—61.5)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to apparatus for automatically regenerating and/or smoothing data received from a manually operated source.

It is a principal object of the invention to provide power aided apparatus for tracking a moving target wherein the application of power will be controlled from a manually actuable source in accordance with a mathematical constant functionally related to the distance of the target from the tracking station.

A further object of the invention is to provide power aided apparatus for tracking a moving target in rectilinear, unaccelerated motion in accordance with the azimuth rate of the target about the tracking station wherein the azimuth rate is established by means manually operable in accordance with a mathematical constant and a conjugately operable rate mechanism adapted to establish a rate proportional to the reciprocal of the square of the distance of the target from the tracking station, or a similar aiding ratio.

A still further object of the invention is to provide apparatus for tracking a moving target that will regenerate the data set thereinto and drive a tracking device in accordance therewith.

Another object of the invention is to provide apparatus for tracking a moving target that will automatically regenerate and smooth data obtained in manually tracking in the target.

The specific nature of the invention as well as other objects and advantages thereof will clearly appear from a description of a preferred embodiment as shown in the accompanying drawings in which:

Fig. 1 is a horizontal projection showing elements of data employed in the operation of the apparatus of this invention.

Fig. 2 is a schematic view showing a regenerative azimuth tracking apparatus in accordance with this invention.

Fig. 3 is a schematic view showing a modification of the apparatus of Fig. 2.

Fig. 4 is a schematic view showing a combination regenerative azimuth tracking and smoothing apparatus in accordance with this invention.

Fig. 5 is a schematic view showing a modification of the apparatus shown in Fig. 4.

Fig. 6 is a schematic view showing apparatus conforming with the invention suitable for smoothing data obtained from an independently operable data transmitting unit.

Fig. 7 is a graph showing an alternate aiding ratio that may be employed with the azimuth regenerative tracking apparatus.

Fig. 8 is a view showing certain elements of data used in the apparatus shown in Fig. 9.

Fig. 9 is a schematic view of a range regeneration apparatus conforming with the present invention.

In Fig. 1, which is a diagrammatic plan view of the target path and its relation to tracking station G, it is assumed that the target moves in azimuth with rectilinear unaccelerated motion (or ground velocity of $S_g$) from right to left along the line T—T, the present position of the target being the point $T_0$. The symbols appearing in Fig. 1 are identified as follows:

$\epsilon_a$ = rate of angular travel of target in azimuth in radians per second;
$A_0$ = the angle included between $R_m$ and $R_0$;
$R_m$ = the least horizontal range to the target path T—T;
$R_0$ = the horizontal range to the present position $T_0$ of the target; and
$S_g$ = the ground velocity of the target, it will be observed that:

$$\epsilon_a = \frac{S_g \cos A_0}{R_0}$$

but $$\cos A_0 = \frac{R_m}{R_0}$$

hence by substitution $$\epsilon_a = \frac{S_g R_m}{R_0^2}$$

therefore, the azimuth rate about tracking station G for a target at present position $T_0$ in rectilinear unaccelerated motion is the constant $S_g R_m$ divided by the square of the present horizontal range $R_0^2$. With this relationship in mind it then becomes apparent that if an apparatus is driven at a rate proportional to the reciprocal of $R_0^2$ multiplied by a constant proportional to $S_g R_m$ that it will have an angular velocity proportional to that of the target and may be employed to keep any desired instrument or apparatus trained upon the target to thereby track the same as it traverses its course. To this end I have provided apparatus embodying mechanism operable to produce a rate proportional to $1/R_0^2$ and also operable to set up and multiply this rate by the multiplying constant $S_gR_m$ in conformity with the above theory.

In Fig. 2 apparatus showing one embodiment of the invention is disclosed. This apparatus is particularly arranged for regenerative azimuth tracking and comprises an azimuth gear 10 adapted to be rotated about its axis for the purpose of orientation and thereafter relatively fixed in such oriented position. The remainder of the apparatus shown in Fig. 2 is mounted upon any type of suitable support 11 arranged to be rotated about the azimuth gear 10 by means of a worm gear 12, shaft 13, differential 14, shaft 15 and handwheel 16.

A three-dimensional cam 17 translatable in the value $S_gR_m$ and rotatable in the value $R_o$, designed to have a lift proportional to $S_gR_m/R_o^2$ is mounted upon support 11 through the medium of a shaft 18 for translatory axial and rotational movement. Translatory movement of cam 17 is effected through a bracket 19 associated with the cam, a lead screw 20 interthreaded with the bracket in such manner that the bracket will be translated upon rotation of the screw, and a mechanical train for rotating the screw comprising bevel gears 21, 22, shaft 23, and bevel gears 24, 25 organized to transmit rotation of shaft 15 to the screw 20. Cam 17 is rotatable by means of a gear 26 affixed to the cam and intermeshing gear 27 attached to a shaft 28 rotatably mounted upon the support 11.

There is also mounted upon support 11 a conventional variable speed drive or rate mechanism generally indicated at 29. The rate mechanism comprises the constant speed motor 30, disk 31 disposed in driven relation to the motor, cylinder 32, and ball carriage 33 interposed between the disk and cylinder with the balls 34 thereof so arranged as to be enabled to transmit motion from the disk to the cylinder. The ball carriage 33 is provided with a follower arm 35 normally maintained in contact with the surface of cam 17 and a shaft 36 connected with cylinder 32 serves as the input shaft to a torque amplifier 37 from the rate mechanism. An output shaft 38 interconnects the torque amplifier and differential 14.

In the operation of the apparatus shown in Fig. 2, assuming that the same has been positioned at the tracking station G and the azimuth gear 10 fixed, an operator will rotate shaft 15 by means of handwheel 16 to rotate the support 11 about the gear 10 through gear 12 and thereby cause any suitable type of sighting instrumentality mounted upon the support to be trained upon a target in azimuth. If the target is moving, the operator will continue to rotate shaft 15 to keep the sighting instrumentality trained upon the target and in so doing will rotate shaft 23 through bevel gears 24, 25 to rotate lead screw 20 through the bevel gears 21, 22. Clutch 23C is interposed in shaft 23 to prevent rotation of bevel gears 22—21 until such time as the sighting instrumentality has been trained upon the target and the actual operation of tracking the target commenced. It should be understood that the clutch 23C remains disconnected until the operator has been able to train the sighting instrumentalities upon the target and preferably has tracked it for a short trial period. When the operator is ready to introduce the tracking rate into the device, the clutch 23C is first closed so that the ensuing tracking of the target will be transmitted to the cam 17 and will move it translationally in accordance with the rate of handwheel turning. Rotation of lead screw 20 will translate the cam 17 upon shaft 18 from a position corresponding to its normal zero setting an amount proportional to the constant $S_gR_m$ by reason of the design of the cam, which it will be recalled is translatable in the value $S_gR_m$ and rotatable in the value $R_o$ to have a lift equal to $S_gR_m/R_o^2$. Simultaneously with the translation of cam 17, the cam will also be rotated by shaft 28 and gear 27, angularly driven from a director or range device of any conventional type in proportion to the value of $R_o$, to rotate the cam to a corresponding $R_o^2$ position from an initial zero position. When cam 17 has been translated to $S_gR_m$ and rotated to $R_o^2$ from its normal zero position the lift $S_gR_m/R_o^2$ thereof will displace follower 35 and ball carriage 33 correspondingly, and the disk 31 driven at a constant speed by the constant speed motor 30 will rotate the cylinder 32 through the balls 34 at a rate proportional to $S_gR_m/R_o^2$. As the drive from disk 31 to cylinder 32 through the balls 34 is a frictional drive the output shaft 36 secured to cylinder 32 is not adapted to drive heavy loads, consequently, this shaft serves as the input shaft to a torque amplifier 37 which greatly augments the deliverable torque of shaft 36 through the output shaft 38. Output shaft 38 is connected to differential 14 and may drive the support 11 about gear 10 through shaft 13 and gear 12. After the operator has initially tracked the target with handwheel 16 and shaft 15 to set up the constant $S_gR_m$ on the cam 17 and shaft 28 is rotated to maintain a position conforming to $R_o$ the apparatus will automatically maintain itself trained upon a target having rectilinear unaccelerated motion through the power drive comprising the motor 30, rate mechanism 29, shaft 36, torque amplifier 37, shaft 38, differential 14, shaft 13, and gear 12. It should be observed that the shaft 28 is rotated at all times from the director so that the three-dimensional cam 17 is continuously being rotated in accordance with the changing present range $R_o$ of the target as determined by the director. As the target approaches midpoint, at the least horizontal range $R_m$, the value of $R_o$ decreases; beyond the $R_m$ point, the value of $R_o$ increases. The rotation of cam 17 in correspondence with $R_o$ will cause ball cage 33 to assume a position corresponding to the reciprocal of the $R_o^2$ value. The mechanism thus obviates the usual unsteady state of operation which tends to accompany the manual operation of handwheel 16, shaft 15, differential 14 and gear 12, by setting up a steady and smooth rate mathematically proportional to the angular travel rate of the target in precise relationship upon which to base calculations in determining the future position of the target. If the target being tracked is in accelerated motion, either positive or negative, adjustment of handwheel 16 will be all that is required to adjust the changing $S_gR_m$, which if properly executed, will not affect the steady state operation accomplished through the power drive. As long as the target is in accelerated motion adjustment of handwheel 16 will be necessary, but, as soon as the target resumes unaccelerated motion handwheel 16 need no longer be adjusted.

Instead of using an aiding ratio that will effect a displacement of the ball carriage 33 that varies with the reciprocal of $R_o^2$ as above, I have found that for a particular combination of design scale factors that the aiding ratio may vary as a function of horizontal range in the manner shown in Fig. 7 and give good results.

A modification of the apparatus disclosed in

Fig. 2 is shown in Fig. 3 wherein the three-dimensional cam 17 of the former apparatus has been omitted. In this instance an azimuth gear 10 and support 11 arranged to be relatively rotated with respect to each other as by the gear 12, shaft 13, differential 14, shaft 15, and handwheel 16 are provided as in the case of the apparatus shown in Fig. 2.

A two-dimensional cam 39 having a lift proportional to $1/R_0^2$ is mounted upon the support 11 for rotation about its axis by the gears 40, 41, and shaft 42, which latter shaft is rotatable in values proportional to $R_0$ by the director or range device associated with the apparatus. As indicated in Fig. 3 a conventional rate mechanism generally indicated at 43 is mounted upon the support 11 and has the disk 44 thereof driven by a constant speed motor 45 while the ball carriage 46 is displaceable by the follower 47 arranged to engage and follow the cam surface of cam 39. The cylinder 48 driven by the balls 49 of the rate mechanism has affixed thereto a shaft 50 which drives the disk 51 of a second rate mechanism generally indicated at 52. The ball carriage 53 of rate mechanism 52 is displaceable in proportion to values of constant $S_gR_m$ by means of a rack 54, pinion 55, shaft 56, and intermeshing bevel gears 57, 58 attached to shafts 56, 15, respectively. Cylinder 59 of rate mechanism 52 will rotate at a rate proportional to $S_gR_m/R_0^2$, since the disk 51 thereof is driven by the rate mechanism 43 at a rate proportional to $1/R_0^2$ and the ball carriage 53 thereof is displaced from its normal position of zero displacement by shaft 15 a distance proportional to $S_gR_m$.

The output rate of rate mechanism 52 is delivered to a differential 61 through a shaft 60 affixed to cylinder 59 and the differential actuates a position operating switch 63 through shaft 62. A reversible capacitor motor 64 matches the input to differential 61 from rate mechanism 52, since the input to differential 61 from mechanism 52 will change the setting of position switch 63 and thereby cause motor 64 to run in the correct direction to reestablish the setting of the switch through the motor shaft 65, bevel gears 66, 67, and shaft 68, which latter shaft will subtract the input of shaft 60 to the differential 61 therefrom to maintain the switch properly positioned.

It is apparent that the motor 64, in maintaining a match of the input to differential 61 from shaft 60 and rate mechanism 52 will rotate shaft 66 at a rate proportional to shaft 60 or proportional to $S_gR_m/R_0^2$ and therethrough drive the support 11 about gear 10 through differential 14, shaft 13, and gear 12 at a corresponding rate to maintain any sighting instrumentalities mounted upon support 11 trained upon a target in rectilinear unaccelerated motion that is being tracked. As in the case of the apparatus shown in Fig. 2 adjustment of handwheel 16 will adjust the output rate from rate mechanism 52 to the rate of a target in accelerated motion.

It sometimes occurs that it is desirable to smooth the tracking irregularities that may arise in the operation of the apparatus of Fig. 2 under certain circumstances, and to also correct for lag in response to changes in tracking data before transmitting the same to another station. For these purposes I have provided the apparatus of Fig. 4 wherein parts corresponding to similar parts of the apparatus shown in Fig. 2 are identified by similar reference characters. In addition to those parts corresponding to similar parts of Fig. 2 there is provided a second variable speed drive or rate mechanism generally indicated at 70 arranged to have its disk 71 driven by the shaft 72 through bevel gears 73, 74 in turn driven by the constant speed motor 30. The ball carriage 75 is displaceable from its normal position of zero displacement by means of the rack 76, pinion 77, differential 78, shaft 79, bevel gears 80, 81 and shaft 15 in the manner shown in Fig. 4. Cylinder 82 of the rate mechanism 70 is also connected with differential 78 by shaft 83 and to a second differential 84 by shaft 85. The differential 84 in addition to being coupled with cylinder 82 is coupled with shaft 38 through the shaft 86 and bevel gears 87, 88. As clearly shown in Fig. 4 the output of differential 84 is transmitted to the fine and coarse azimuth transmission motors 89 and 90, respectively, through the gears 91, 92, shaft 93, gears 94, 95 and shaft 96. In this construction it may be observed that shaft 38 delivers a smooth azimuth output, and that such output is equal to the input on shaft 13 plus or minus any added $S_gR_m/R_0^2$ input from shaft 15 in conjunction with modifying action through slide 19, cam 17, etc. If by operation of the handwheel 16, and regenerative response of the apparatus the system has been matched with the angular velocity of a target being tracked, a sudden change in azimuth will be compensated for by the operator moving shaft 15 by means of handwheel 16, but shaft 38 will respond to the change more slowly thus tending to smooth the output from shaft 38 which drives the support 11 and data transmitters 89, 90. Thus it is apparent that in all cases, since the rate mechanism 70 does not respond instantly to rotation of shaft 15, it will smooth out irregularities occurring in the manipulation of shaft 15.

Fig. 5 discloses a modified form of the regenerative tracking and smoothing apparatus shown in Fig. 4 and in this view the elements common to the apparatus shown in Figs. 2 and 4 are identified by corresponding characters. The system shown in Fig. 4 has the limitation that when settled on the target the operator's handwheel 16 will be displaced from its normal zero position thereby causing generated azimuth as represented by the rotations of shafts 13 and 93 to lag actual azimuth by the amount of displacement of the handwheel which must be compensated for by the lag correcting rate mechanism 70, etc., in Fig. 4 before transmission. In the instant apparatus greater flexibility of adjustment of shaft 15 is gained by interposing a second variable speed drive or rate mechanism generally indicated at 97 between the operator's handwheel 16 and lead screw 20. The second rate mechanism 97 is arranged to have its disk 98 driven by the constant speed motor 30 which drives the disk 31 of the first rate mechanism 29 through the bevel gears 99, 100 and shaft 101. The ball carriage 102 of the second rate mechanism is displaceable from its normal position of zero displacement by the rack 103 and pinion 104 affixed upon shaft 23 whereby displacement of the ball carriage 102 will be effected by the operator in turning the shaft 15 by means of the handwheel 16. Cylinder 105 of the second rate mechanism is connected to the differential 106 in such manner as to add its output to the adjustment of shaft 23 to position lead screw 20. After the combined action of shafts 23 and variable speed drive 97 has axially adjusted cam 17 to the position necessary to cause the target to be automatically tracked, it is necessary, to maintain this position, to center ball cage 102 relatively to disc 98. This is done by reversing the operation of handwheel 16 to restore it and shafts 15 and 23 to initial or starting position. The output of shaft 38 is then a smoothed version of azimuth, with no lag for rectilinear target courses. Similar to the apparatus of Fig. 4 fine and coarse azimuth transmitters 107, 108, respectively, are driven by shaft 38 through the gears 109, 110, shaft 111, and gears 112, 113. By the return of the shaft 23 to its normal position of zero displacement, the azimuth output of shaft 38 is rendered smooth in character, as it is devoid of the irregularities of manipulation of handwheel 16. and contains no lag for rectilinear courses of a target after lead screw 20 has been properly positioned. Moreover, in the case of uniformly accelerated targets, or targets pursuing a circle course about the tracking station in such manner that the rate of change of $R_m$ is constant, an operator in using this apparatus will be enabled to find a final setting for handwheel 16 after which tracking of the target is accomplished by the apparatus automatically.

In Fig. 6 apparatus for smoothing azimuth data coming from an available azimuth unit not provided with such refinement is shown. In this apparatus incoming azimuth data will be received by the azimuth receiver 114 and matched in a conventional manner by a follow-up motor 115 controlled by the position switch 116 in turn controlled by the azimuth receiver. The motor 115 rotates a shaft 117 which acts through bevel gears 118, 119, and shaft 120 to drive the differential 121 which is connected by shaft 122 and gear 123 to the position switch 116. A variable drive or rate mechanism generally indicated at 124 has the cylinder 125 thereof driven by shaft 126, bevel gears 127, 128, shaft 129, bevel gears 130, 131, shaft 132, bevel gears 133, 134, and constant speed motor 135. The cylinder 125 of rate mechanism 124 drives the disk 136 thereof through the balls 137 mounted in ball carriage 138. The ball carriage 138 is displaceable by the follower 47, cam 39, gears 40, 41 and shaft 42 in proportion to $R_0^2$ so that the disk 136 is driven at a rate proportional to $1/R_0^2$.

A second variable drive or rate mechanism generally indicated at 139 is arranged to have its disk 140 driven from the disk 136 of rate mechanism 124 by a shaft 141 interconnecting the two disks. The ball carriage 142 mounting the balls 143 is interposed between the disk 140 and cylinder 144 and is displaceable from its normal zero position of displacement by means of the rack bar 145, rack 146, and pinion 147 attached to shaft 117. The cylinder 144 is connected by bevel gears 148, 149, and shaft 150 with a differential 151. Shaft 150 is further interconnected with differential 121 by the bevel gears 152 and 153.

As clearly shown in Fig. 6 a third rate mechanism indicated at 154 has the disk 155 thereof driven by the motor 135 and the cylinder 156 is driven from the disk through the ball carriage 157 and balls 158. The cylinder 156 is connected by a shaft 159 to a differential 160 which latter is also connected to shaft 117. A pinion 161 is connected with the output side of differential 160 and engages a rack 162 which upon movement will displace the ball carriage 157 from its position of zero displacement by means of the interconnecting rack bar 163. Shaft 159 is also intergeared with differential 151 through the bevel gears 164, 165 and shaft 166 and differential 151 is connected to the smooth azimuth transmitter 167 by shaft 168.

By the arrangement thus described with respect to Fig. 6 it will be seen that variable speed drive 124 produces a rate proportional to $1/R_0^2$ and transmits such rate to variable speed drive 139 which multiplies it by $S_sR_m$ to match the azimuth being received by receiver 114. The output of variable speed drive 139 is transmitted to differential 151 as a smoothed azimuth and to this azimuth so transmitted is added the lag correction supplied by variable speed drive 154 through shaft 166 and the differential 151. The output from differential 151 is a smoothed version of the azimuth received by receiver 114 corrected for lag and is transmitted to the azimuth transmitter 167 by shaft 168.

For the purpose of obtaining smooth range set-in, especially to be used in connection with the azimuth regeneration apparatus previously described, there is shown in Fig. 9 one desirable form of such apparatus. By referring to Fig. 8 it may be seen that in the right triangle shown (in which $D_m$, least slant height, is constant) that:

$$D_0^2 = y^2 + D_m^2 \tag{1}$$

Differentiating (1) with respect to time $$D_0\dot{D}_0 = y\dot{y} \tag{2}$$

Differentiating (2) with respect to time $$\frac{d}{dt}(\dot{D}_0 D_0) = \dot{y}^2 = s^2 \text{ (where } s \text{ is constant speed of target)} \tag{3}$$

which shows that the rate of change of the product of range $D$ and range rate $\dot{D}_0$ is constant for a target in rectilinear unaccelerated motion.

The range regeneration apparatus comprises a shaft 170 connected to a differential 171 and is manipulatable by a handwheel 172. A first variable speed or rate mechanism indicated at 173 is arranged to have the ball carriage 174 thereof displaced from its position of normal zero displacement by the rack bar 175, rack 176, pinion 177, shaft 178, bevel gears 179, 180, shaft 181 and bevel gears 182, 183 through rotation of shaft 170. Disk 184 of rate mechanism 173 is driven by the constant speed motor 185 which also serves to drive the disk 187 of a second variable speed drive or rate mechanism 186, by means of the bevel gears 188, 189, shaft 190, bevel gears 191, 192 and shaft 193. Cylinder 194 of rate mechanism 186 is arranged to drive the disk 196 of a third rate mechanism 195 through the bevel gears 197, 198 and shaft 199. The ball carriage 200 of rate mechanism 186 is displaceable from its position of zero displacement by a two-dimensional cam 201 and follower 202. The cam 201 is functionally equivalent to the cam 39 of Figs. 3 and 6 and is designed to have a lift proportional to $1/D_0$ when rotated in proportion to $D_0$ by the gears 203, 204, shaft 205, bevel gears 206, 207, shaft 208, bevel gears 209, 210 and shaft 211 connected to the differential 171. As clearly shown, the cylinder 212 of rate mechanism 173 is connected by a shaft 213 with differential 214, the latter being connected with pinion 177 and a shaft 215. A pinion 216 is affixed to shaft 215 in intermeshing relation with a rack 217 connected to the ball carriage 219 by the rack bar 218 whereby movement of the carriage from its normal position of zero displacement will be effected upon rotation of shaft 215. The cylinder 220 of rate mechanism 195 is connected to differential 171 by shaft 221.

In operation the operator will turn handwheel 172 which will turn shaft 170 and shaft 211 through differential 171 to control the range set in device. The output from shaft 211 is fed back to cam 201 which displaces the ball carriage 200 in inverse proportional relation to the generated slant range $D_0$. The disk 187 of rate mechanism 186 is rotated at a constant speed by the motor 185 so that cylinder 194 will have an output rate inversely proportional to range $D_0$ thereby driving disk 196 of rate mechanism accordingly. Movement of handwheel 172 also adjusts the ball carriage 174 of rate mechanism 173 and through differential 214, shaft 215, pinion 216, rack 217 and rack bar 218 likewise adjusts the ball carriage 219 of rate mechanism 195. If the target is in rectilinear unaccelerated motion, shaft 215 will turn at a constant rate and rate mechanism 173 will settle to this correct rate, after which the operator need no longer rotate handwheel 172. With the constant of the system properly chosen the rotation of shaft 215 will be proportional to the product of range and range rate which as above shown is known to change at a constant rate. It may be observed that rate mechanism 173 could be eliminated in which case the apparatus becomes simply an aided tracking apparatus with an aiding ratio that increases with range. If rate mechanism 173 is sufficiently sluggish the response characteristics of the apparatus as revealed to an operator will be similar to those of a good aided tracking apparatus.

In interpreting the claims, it will be understood that the target is assumed to be moving in a rectilinear path with unaccelerated or constant speed and that the term "present range" means the instantaneous range of the target from a point in fixed spatial relation to the apparatus. It will also be understood that, where variable speed drives or variable speed devices are included, each is assumed to have an input operated at constant speed, a speed-varying element, and an output or output element operated at a speed proportional to the adjustment or position of the speed-varying element. Within these broad limitations any well-known variable speed devices may be used.

Speaking generally, the system performs a double integration from a course constant in order to obtain slant range continuously. The operator's handwheel sets the constant. Now differentials 214 and 171 could be dispensed with if the operator could initially set the correct value of the course constant, and if the tracking device were initially on target, and all portions of the mechanism were in their proper initial positions. This is, of course, impossible, and the relations between the components of the mechanism must be such that the operator always makes a consistent response to a tracking error which he observes (i. e., he always moves his handwheel in the same direction to correct for a lag, but in the opposite direction to correct for a lead) and moreover, that these operator corrections, applied irregularly according to the acuity and physiological reaction time of the operator must cause the tracking device to settle toward the proper set of conditions when the ranging device (ranging and tracking devices are here considered to mean the same instrumentality which measures slant range) will be "on target" and the operator may release his control, after which the device will generate range continuously and accurately as long as the target performs rectilinear unaccelerated flight. Briefly, not only must the device be capable of providing a correct solution, but it must approach this solution correctly from any initial set of erroneous settings which may occur.

Referring to Figure 9 for an elementary statement of the functions of the elements. It has been derived that if the target flies a straight line at constant speed, the rate of change of the product of range rate by range itself will be constant. Since in regenerative tracking it is desired to give the operator a control which will come to rest after an initial tracking period, his handwheel will be designated as the element which is to represent this course constant (henceforth called $Y = d/dt \, (\dot{D}_0, D_0)$ for brevity). The mechanism must therefore so operate as to correctly generate range if Y is correctly set, and to force the operator to make the proper settings to derive Y if (as will always be true) Y is not correct initially.

First, a shaft turning an amount proportional to slant range itself is desired. This is shaft 211. Now this shaft can always be made to turn to slant range if the mechanism between it and the operator is reasonably responsive, for the operator may be thought of as turning his handwheel in any manner necessary to make the range finder driven from shaft 211 read the correct range. Of course it will be necessary to make the operator's functions not only reasonable but simple.

Having a shaft representing slant range, the slant range rate is desired. Variable speed drive 195, 196, 220, generates a rate which is additive to the operator's adjustment as it appears on shaft 170. If the cylinder 220 turns at less than the proper rate (and the operator makes no adjustment) the range finder will lag. The operator will make a natural corrective movement of his handwheel 172 to "catch up," and in addition to this correction going straight through to the range finder over shaft 170, differential 171 and shaft 211, it will pass by means of shaft 181, 178 through differential 214 to advance the rate output of variable speed drive at 220. As long as the rate of cylinder 220 is deficient, this process of adjustment will continue. When the rate is right, the shaft 211 will be driven continuously and automatically at the right rate to maintain range contact and the operator will need to make no further corrections.

It is known, however, that the range rate itself is not constant, and with only variable speed drive at 220 to assist, the operator would continually be making new adjustments to compensate for the change in range rate. Use of the constancy of the rate of the product of range and range rate is now introduced. The disc 196 of the rate generating variable speed drive is caused to rotate at a rate proportional to $1/D_0$. In order to stay on target, cylinder 220 must still turn at the range rate $\dot{D}_0$. The only ball cage position which will permit this, however, is one which places the balls a distance proportional to $\dot{D}_0 D_0$ from the center of the disc. Then the cylinder rate, when the device has settled on target is $\dot{D}_0$, the disc rate is again $1/D_0$ since the range finder is being maintained on target, and the ball cage displacement is $\dot{D}_0 D_0$.

But it has been shown that even $\dot{D}_0 D_0$ is not constant—only the rate of its product being invariant. Hence, without the assisting mechanism of variable speed drive 212, the operator would continuously be required to turn his handwheel to move the ball cage 195 to supply the rate of change of $\dot{D}_0 D_0$. It is known, however, that this is a constant rate, hence an additional variable speed drive may be introduced to supply the rate.

Again, the manner of its introduction must be such that no difficult manipulation on the part of the operator is required.

Note, therefore, that when an adjustment of handwheel 172 is made, the component which moves shafts 178 and 215 to adjust ball cage 195 also adjusts ball cage 173, thus causing a rate to appear on shaft 215 in addition to the direct adjustment communicated to shaft 215 by the adjustment of handwheel 172.

There now follows this sequence of operations: The operator does whatever is necessary to his handwheel to get initial range contact and to maintain it. It is not immediately evident, but actually the mechanism allows him to make this adjustment conveniently. It is apparent that one result of an adjustment of handwheel 172 is an immediate and proportional movement of shaft 211, and therefore, an immediate adjustment in position of the range finder, so that the operator is immediately cognizant of the qualitative effect of his correction. Since the quantitative effect also involves the two integration processes, these are not immediately apparent to the operator, but each integration process is modified in the same direction (by choice of sign of the gearing) as the basic handwheel adjustment. This condition is a requirement for stable operation of the device. Thus, if the device lags the target range, the operator turns his handwheel to "catch up." This adjustment is at once apparent to the operator as stated above; hence, he does not tend to over-correct. The same adjustment, however, also immediately (by the component which passes directly through differential 214) increases the rate of cylinder 220, thereby causing the device to have less tendency to lag the target after the adjustment, and the same adjustment by moving ball cage 173 increases the rate of cylinder 212, and hence, of ball cage 195 so that the rate of change of rate of cylinder 220 is increased, thus anticipating future increases in the target's range rate.

It is evident intuitively, and can be demonstrated mathematically by writing the differential equations of motion relating the integration processes, that any adjustment of handwheel 172 must make a correction of the position of ball cage 174 which is not too large with relation to the concomitant adjustments in position (through differential 171) and in rate (at ball cage 195), or the acceleration of motion of ball cage 195 will be so great as to cause overshooting and hunting about the true target position.

Now, providing that the various gear ratios have been so chosen as to prevent the tendency of this device to overcorrect, it will be seen from the foregoing discussion that regardless of the initial position of any of the elements, the natural response of the operator in turning his handwheel to get on target, and thereafter to stay there, will be such as first to cause shaft 211 to move to a position proportional to slant range; second, to cause ball cage 195 to move to a position proportional to $D_0 \dot{D}_0$; and third, to move ball cage 173 to a position proportional to $d/dt$ ($D_0 \dot{D}_0$) or Y. But Y is a constant, hence, with the mechanism and the range finder "on target," and ball cage 173 at a position proportional to Y, the operator's handwheel which is directly geared through shaft 181 and 178 to ball cage 173 is in a position which is also proportional to Y. Since Y is constant the position of the operator's handwheel is a constant.

Describing the process physically, the operator trains his sight on the target, then finds that his handwheel must be turned slower and slower (or smaller and smaller corrections) until he may release it, and his range finder will stay continually on target until the target maneuvers. Since the range being produced is the result of machine integration it will be smooth.

With regard to the shafts 13 and 92 of Figure 4, the whole instrument is considered as a tracking device supplying azimuth data by means of data transmitters 89 and 90 to a computer which may or may not be integral with the tracking head. Then the position of shaft 92 is a "smoothed" version of the position of shaft 13 in the following way: shaft 36 is the generated azimuth rate of the instrument. Now there will always be small tracking disturbances caused by the observer who will be continually trying to improve his control setting or adjusting it to conform to displacements of the airplane from straight flight caused by atmospheric irregularities. The integration process between the handwheel 16 and the shaft 36 tends to smooth out these irregularities in the rate, but the position component transmitted by shaft 15, differential 14, and shaft 13 conveys the irregularities. Hence, it is not desirable to employ the position of shaft 13 as "smooth azimuth" since this would require the observer himself to ignore small irregular disturbance of the airplane rate from the generated rate. It is better to provide an additional mechanism which eliminates the necessity of discretion on the part of the operator and allows him to follow all airplane disturbances. This is the variable speed drive 70, the cylinders of which reproduce but sluggishly the position of shaft 79, so that disturbances of shaft 79 of short duration compared with the matching time of variable speed drive 70 will not be transmitted to drum 82. The addition of position of shaft 85 to position of shaft 86 at differential 84 then corresponds to the addition of position of shaft 38 to the position of shaft 15 at differential 14 with the exception that the position of shaft 85 is an average of the successive positions of shaft 15 over an interval of time. Then shaft 92 corresponds in position to shaft 13 except that it does not reproduce the short time disturbances which may appear on shaft 13 by adjustments of the operator.

The apparatus of Figure 6 is intended to constitute an intermediate unit which might be located between a tracking device such as a radio locator, and a computing device. It might, however, be built integral with either. Azimuth tracking data which might be quite irregular as produced by errors of the tracking device are received and duplicated as shaft movement by Selsyn 114 and motor 115. The rest of the circuit operates on this received data to smooth it according to the known law by which azimuth rate must vary (i. e., $S_g R_m/R_0^2$) and Selsyn transmitter 167 then transmits the smoothed and, therefore, improved data to the computing unit which performs the prediction and ballistic transformations.

Having now described what is regarded as the presently preferred embodiment of the apparatus, I claim:

1. In apparatus for tracking a moving target traversing the leg of a right triangle in accordance with the relation $S_g R_m/R_0^2$, where $S_g$ is the ground speed of the target; $R_m$ is the least range or leg of the triangle adjoining the leg thereof being traversed by the targets, and $R_0$ is the slant range or hypotenuse of the triangle, a first shaft rotatable from an initial position in proportion to $S_gR_m$, a second shaft, a differential interconnecting said first and second shafts, a drive mechanism having a variable speed output drive, a three-dimensional cam translatable from an initial position in proportion to $S_gR_m$ and rotatable in proportion to $R_0$, to thereby effect a lift proportional to $S_gR_m/R_0^2$, means interconnecting the first shaft and cam for translating the cam in scale relation, means for rotating the cam, a follower directly interposed between the cam and drive mechanism for regulating the output drive of the drive mechanism to a speed proportional to $S_gR_m/R_0^2$, and means directly connecting the output drive of said drive mechanism with the third element of the differential in driving relation; whereby the second shaft may ultimately be power driven through said differential at a rate proportional to $S_gR_m/R_0^2$.

2. In apparatus for tracking a target moving along a supposedly rectilinear path, a three-dimensional cam adapted, when adjusted in a first dimension in accordance with present range of said target, and in a second dimension in accordance with a factor equal to the product of speed of said target and minimum distance of said path from a predetermined position, to effect a resultant movement proportional to said factor divided by the square of said present range, manually operable means connected to move said cam in said second dimension, a first variable speed drive having its speed-varying element controlled by said cam in accordance with said resultant movement, a second variable speed drive, a first differential having one side connected to be actuated by said manually operable means, and its second and third sides in driving connection with the speed-varying element and output respectively, of said second variable speed drive, a second differential having first and second sides connected to be driven by the outputs of said first and second variable speed drives, respectively, transmitter means connected to be driven by the third side of said second differential, a shaft, a third differential having its first, second and third sides connected in driving relation, respectively, with said manually operable means, the output of said first variable speed drive, and said shaft, and means driven by said shaft to track a target.

3. In an apparatus for tracking a target supposedly moving in a rectilinear path, a three-dimensional cam adapted, when moved in a first dimension in accordance with present range of said target, and in a second dimension in accordance with a factor equal to the product of speed of said target and minimum range of said path, to produce a third movement proportional to said factor divided by the square of said present range, means controlled by said cam and producing an output speed proportional to the time integral of said third movement, first, second, and third differentials, variable speed smoothing means including two sides of said first differential and having an output connected to drive one side of said second differential, the second sides of said second and third differentials being driven by said first named means in proportion to said output speed thereof, a single manually operable means connected to simultaneously move said cam in said second dimension, and to actuate the first sides of said first and third differentials, means driven by the third side of said third differential producing an output for driving a tracking device, and telemetric transmission means connected to be driven by the third side of said second differential.

4. In an apparatus for tracking a target moving along an assumedly rectilinear path, a three-dimensional cam adapted to be moved in one dimension proportional to present range of said target and in a second dimension proportional to a factor equal to the product of target speed and minimum range of said path from a point adjacent said apparatus, to thereby effect an output movement equal to said factor divided by the square of said present range, first and second variable speed drives, each having an output and a speed-varying element, means moving said speed-varying element of said first variable speed drive in response to said output movement of said cam, a first differential, a single manually operable means connected to actuate said cam in said second dimension and a first side of said first differential, the second and third sides of said first differential being connected, respectively, to the speed-varying element and output of said second variable speed drive, a second differential, means connecting the outputs of said variable speed drives to first and second sides, respectively, of said second differential, and telemetric transmission means connected to be driven by and in straight line proportion to the movement of the third side of said second differential.

5. An apparatus as in claim 4, a constant speed motor, an input for each of said variable speed drives, and a driving connection between each said input and said motor.

6. An apparatus for tracking a target moving along an assumedly rectilinear path comprising a manually operable shaft, a three-dimensional cam rotatable on an axis and adapted, when rotated proportional to present range of a target and translated along said axis proportional to a factor equal to the product of speed of said target and minimum range of said path, to produce a lift equal to said factor divided by the square of present range, a driving connection so translating said cam in response to operation of said shaft, a first variable speed drive having a speed-varying member, means controlling said member by and in proportion to the lift of said cam, a second variable speed member, a first differential having its first side connected to be operated by said shaft and having its second and third sides connected respectively to the speed-varying member and output of said second variable speed drive, a second differential having first and second sides connected, respectively, with the outputs of said variable speed drives, and telemetric transmitter means connected to be driven by the third side of said second differential.

7. An apparatus for tracking a target, comprising a first differential, first and second shafts connected to respective sides of said differential, a three-dimensional cam rotatable about an axis in proportion to present range of said target and translatable along said axis in proportion to a factor equal to the product of target speed along a path and minimum range of said path, said cam being formed to effect a lift, when so rotated and translated, equal to said factor divided by the square of said present range, a driving connection translating said cam in response to rotation of said first shaft, means for rotating said cam, a first variable speed drive, a follower actuated by the lift of said cam and effective to vary the output of said first variable speed drive, a second variable speed drive, second and third differentials, means operating the first side of said differential in response to rotation of said first shaft, means connecting the speed control element and output of said second variable speed drive to the second and third sides, respectively, of said second differential, means connecting the outputs of said variable speed drives to respective sides of said third differential, a connection driving the third side of said first differential from the output of said first variable speed drive, means driven by said second shaft for tracking a target, and telemetric transmission means connected to be driven by the third side of said third differential.

8. In a regenerative tracking apparatus for a tracking device, first means adapted to effect a first movement proportional to the instantaneous range from a predetermined point, of a target moving in a rectilinear path, second means manually operable to effect a second movement proportional to the product of the speed of said target and the minimum range of said path from said point, third means combining said first and second movements to effect a resultant movement proportional to said product divided by the square of said instantaneous range, fourth means controlled by said resultant movement to effect an output movement having a rate proportional to said resultant movement, differential means, connections driving first and second sides of said differential means from said second and said output movements, respectively, and a driving connection from the third side of said differential means to angularly move said tracking device.

9. In a regenerative apparatus for tracking a target proceeding along a rectilinear path at constant speed, first means adapted to be operated to produce a first movement proportional to the instantaneous range of said target from said apparatus, second means manually operable to produce a second movement proportional to the product of the speed of said target and the minimum range of said path from said apparatus, third means responsive solely to said first and second movements to produce therefrom a resultant output movement having a rate proportional to said product divided by the square of said instantaneous range, said third means including a cam moved by said first means to give a lift inversely proportional to the square of said instantaneous range, differential means, means drivingly connecting said second and third means to respective sides of said differential means, and means operated by a third side of said differential means to angularly move a tracking device in proportion to the algebraic sum of first and said resultant output movements.

10. In a regenerative tracking apparatus for tracking a target proceeding along a rectilinear path at constant speed relatively to a point adjacent said apparatus, first means movable in accordance with the instantaneous range of said target, second means movable to produce a movement proportional to the product of the speed of said target and the minimum range of said path from said point, third means operated by and responsive solely to the said movements of said first and second means to combine the same and produce an output movement having a rate proportional to said product divided by the square of said instantaneous range, differential means, connections driving first and second sides of said differential means by and from said second means and said third means, respectively, and means actuated by the third side of said differential means to angularly move a tracking device.

HERBERT K. WEISS.

REFERENCES CITED

The following references are of record in the file of this patent:

UNITED STATES PATENTS

| Number | Name | Date |
|---|---|---|
| 1,177,470 | Barr et al. | Mar. 28, 1916 |
| 1,453,104 | Gray | Apr. 24, 1923 |
| 1,831,595 | Gray | Nov. 10, 1931 |
| 1,974,864 | Fletcher | Sept. 25, 1934 |
| 2,066,499 | Watson | Jan. 5, 1937 |
| 2,071,424 | Papello | Feb. 23, 1937 |
| 2,105,985 | Papello | Jan. 18, 1938 |
| 2,206,875 | Chafee et al. | July 9, 1940 |
| 2,377,898 | Myers | June 12, 1945 |
| 2,378,910 | Chafee et al. | June 26, 1945 |
| 2,385,952 | Svoboda | Oct. 2, 1945 |

FOREIGN PATENTS

| Number | Country | Date |
|---|---|---|
| 371,517 | Great Britain | Apr. 28, 1932 |